United States Patent
Park

(10) Patent No.: US 9,880,930 B2
(45) Date of Patent: Jan. 30, 2018

(54) METHOD FOR OPERATING CONTROLLER AND METHOD FOR OPERATING DEVICE INCLUDING THE SAME

(71) Applicant: Samsung Electronics Co., Ltd., Suwon-si, Gyeonggi-do (KR)

(72) Inventor: Young Jin Park, Incheon (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 127 days.

(21) Appl. No.: 14/736,071

(22) Filed: Jun. 10, 2015

(65) Prior Publication Data
US 2015/0363308 A1    Dec. 17, 2015

(30) Foreign Application Priority Data
Jun. 11, 2014   (KR) .................. 10-2014-0070705

(51) Int. Cl.
*G06F 12/02*    (2006.01)
(52) U.S. Cl.
CPC .. *G06F 12/0246* (2013.01); *G06F 2212/7201* (2013.01)

(58) Field of Classification Search
CPC .................. G06F 12/0246; G06F 2212/7201
See application file for complete search history.

(56) References Cited

U.S. PATENT DOCUMENTS

| | | | |
|---|---|---|---|
| 9,152,333 B1* | 10/2015 | Johnston | ............... G06F 3/0641 |
| 2014/0258370 A1* | 9/2014 | Bares | ............... G06F 17/30159 709/203 |
| 2015/0317083 A1* | 11/2015 | Phan | ............... G06F 3/0608 711/103 |
| 2016/0139817 A1* | 5/2016 | Harijono | ............... G06F 3/0608 711/154 |

* cited by examiner

*Primary Examiner* — Reginald Bragdon
*Assistant Examiner* — Mehdi Namazi
(74) *Attorney, Agent, or Firm* — Harness, Dickey & Pierce, P.L.C.

(57) ABSTRACT

A method of operating a controller includes receiving write data having chunks from a host, assigning each of finger prints to each of the chunks, counting the number of duplications of each of the finger prints, and changing a physical address assigned to each of first finger prints among the finger prints based on a count value of each of the finger prints based on a count value of each of the finger prints, and the physical address is assigned by a flash translation layer (FTL).

20 Claims, 9 Drawing Sheets

FIG. 3

TABLE

34A

| Finger Print Index | Link to Finger Print | PA |
|---|---|---|
| A | abcd | 2311 |
| B | efgh | 0257 |
| C | AB | 2333 |
| D | cccc | 3311 |
| ... | ... | ... |

34B

| Finger Print Index | Link to Finger Print | PA |
|---|---|---|
| A | abcd | 0711 |
| B | efgh | 2355 |
| C | AB | 0010 |
| D | cccc | 0000 |
| ... | ... | ... |

CPU

36A

| Finger Print Index | Link to Finger Print | PA | Count Value |
|---|---|---|---|
| A | abcd | 2311 | 109 |
| B | efgh | 0257 | 23 |
| C | AB | 2333 | 311 |
| D | cccc | 3311 | 4222 |
| ... | ... | ... | ... |

Sorting & New allocation
A : 2311 → 0711
B : 0257 → 2355
C : 2333 → 0010
D : 3311 → 0000
Reference Count : 100
First Area PA Range : 0000 ~ 2000
Second Area PA Range : 2001 ~

36B

| Finger Print Index | Link to Finger Print | PA | Count Value |
|---|---|---|---|
| D | cccc | 0000 | 4222 |
| C | AB | 0010 | 311 |
| A | abcd | 0711 | 109 |
| B | efgh | 2355 | 23 |
| ... | ... | ... | ... |

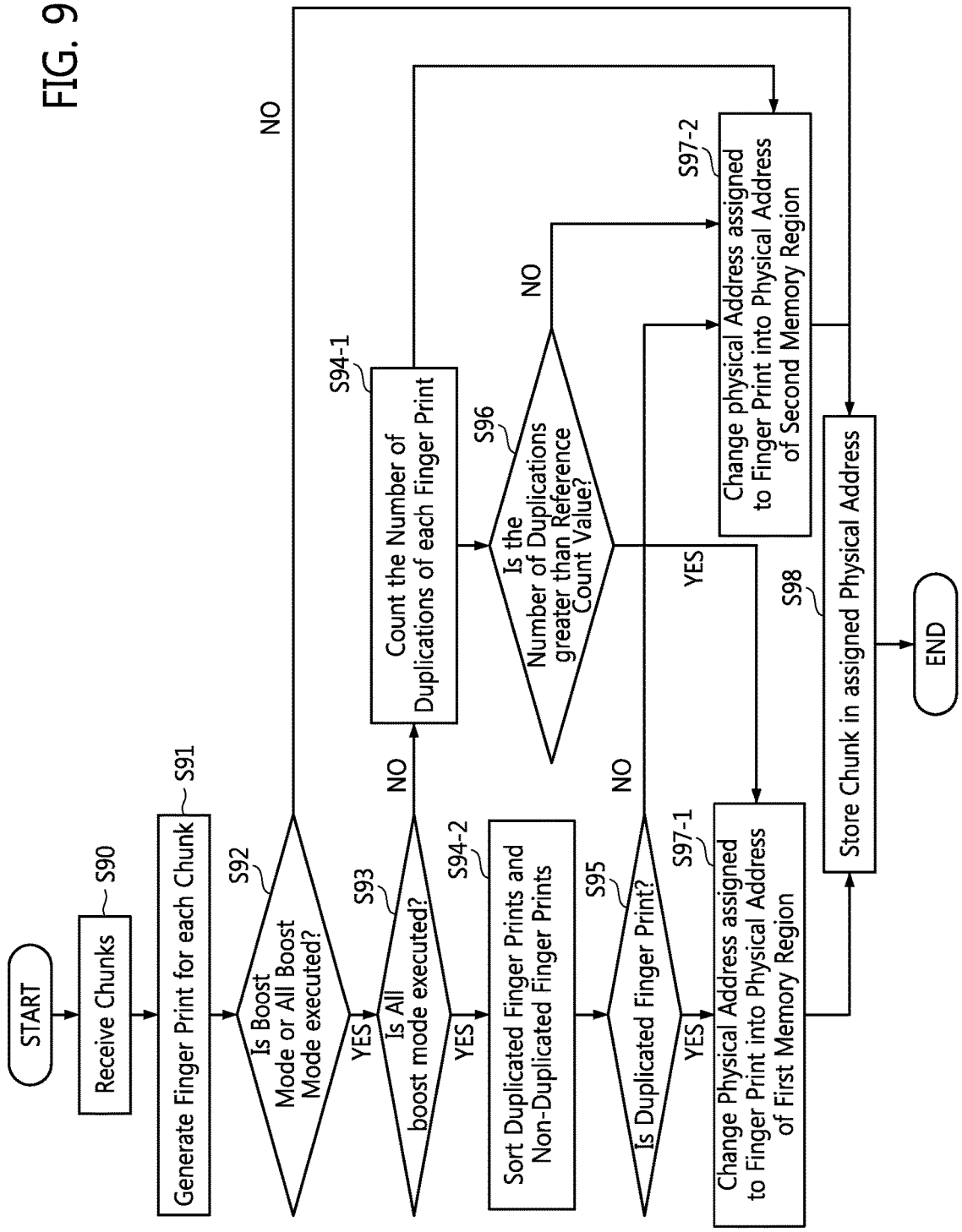

METHOD FOR OPERATING CONTROLLER AND METHOD FOR OPERATING DEVICE INCLUDING THE SAME

CROSS-REFERENCE TO RELATED APPLICATIONS

This application claims priority under 35 U.S.C. § 119(a) from Korean Patent Application No. 10-2014-0070705 filed on Jun. 11, 2014, in the Korean Intellectual Property Office (KIPO), the disclosure of which is hereby incorporated by reference in its entirety.

BACKGROUND

1. Field

At least some example embodiments of the present inventive concepts relate to a data storage method, and more particularly to a controller which is capable of storing the data in one of memory regions with different features according to whether or not the data is duplicated for an efficient storage of data, a method for operating the controller, and a method for operating a device including the controller.

2. Related Art

A flash memory has been widely used in a computer or a memory card because the flash memory can perform a function of collectively erasing data stored in a memory block. Lately, as a use of a portable information apparatus such as a mobile phone, a PDA, or a digital camera is rapidly increased, a flash memory instead of a hard disk is widely used as a data storage device. It is becoming desirable for portable information apparatuses to include a large capacity data storage device to provide a user with various functions (for example, functions of video playback, high quality music playback, and the like).

As a desire for a large-capacity data storage device which can be used in a portable information device increases, a method of saving a data storage space of the large capacity data storage device has been studied by efficiently managing duplicated data among data stored in the large capacity data storage device.

Data duplication removal means improving efficiency of the data storage device by detecting a duplicated portion between different data or files and removing the duplicated portion. The data duplication removal may be one example of data compression.

SUMMARY

A technical object of at least one example embodiment of the inventive concepts is to provide a controller which can count the number of duplications of data to be written in a memory region having a relatively slow write speed, and write the data in a memory region having a relatively fast write speed according to a result of the counting, an operating method thereof, and a method of operating a device which can perform the method.

According to one or more example embodiment, a method of operating a controller includes receiving write data including a plurality of data chunks from a host; assigning a plurality of finger prints to the plurality of data chunks, respectively; counting the number of duplications of each of the plurality of finger prints; and changing physical addresses assigned, respectively, to first finger prints among the plurality of finger prints based on a count value of each of the plurality of finger prints, wherein the physical addresses are assigned by a flash translation layer (FTL).

Count values of each of the first finger prints may be equal to or greater than a reference count value.

When physical addresses corresponding to the first finger prints indicate a second memory region, the changing may change the physical addresses corresponding to the first finger prints into physical addresses indicating a first memory region, the first memory region is a memory region which stores one-bit per cell, and the second memory region is a memory region which stores at least two-bits per cell.

A count value for each of the first finger prints may be less than a reference count value.

When physical addresses corresponding to the first finger prints indicate a first memory region, the changing may change the physical addresses corresponding to the first finger prints into physical addresses indicating a second memory region, the first memory region is a memory region which stores one-bit per cell, and the second memory region is a memory region which stores at least two-bits per cell.

When the physical addresses assigned to each of the first finger prints indicate a first memory region having a first write speed, the changing may change the physical addresses assigned to each of the first finger prints into physical addresses which indicate a second memory region having a second write speed.

The first memory region may be a memory region which stores one-bit information per cell, and the second memory region may be a memory region which stores at least two-bit information per cell.

The first write speed may be faster than the second write speed.

The counting and the changing may be performed by firmware executed by a CPU embedded in the controller.

According to one or more example embodiments of the inventive concepts, a method of operating a data storage device which includes a memory device including memory regions with different features and a controller controlling an operation of the memory device may include receiving a plurality of data chunks successively input; assigning a plurality of finger prints to the plurality of data chunks, respectively; selecting first finger prints among the plurality of finger prints based on whether or not each of the finger prints of the plurality of finger prints is duplicated; changing physical addresses assigned to each of the selected first finger prints; and writing each data chunk that corresponds to one of the changed physical addresses, among the plurality of data chunks, in one of the memory regions, wherein the physical address is assigned by a flash translation layer (FTL).

The selecting may include generating count values for each of the plurality of finger prints by counting a number of duplications of each of the plurality of finger prints; comparing the count values of each of the plurality of finger prints with a reference count value; and selecting the first finger prints according to a result of the comparison.

When the count value of each of the first finger prints are equal to or greater than the reference count value, the physical addresses assigned to each of the selected first finger prints before the changing indicate a memory region which stores at least two-bits per cell among the memory regions, and the changed physical addresses assigned to each of the selected first finger prints indicate a memory region which stores one-bit per cell among the memory regions.

When the count value of each of the first finger prints are less than the reference count value, the physical addresses assigned to each of the selected first finger prints before the changing may indicate a memory region which stores at least one-bit per cell among the memory regions, and the changed physical addresses assigned to each of the selected first finger prints may indicate a memory region which stores two-bits per cell among the memory regions.

When the physical addresses assigned to each of the first finger prints indicate a first memory module having a first write speed, the changing changes physical addresses assigned to each of the selected first finger prints into physical addresses which indicate a second memory region having a second write speed.

The first memory region may be a memory region which stores one-bit information per cell, and the second memory region may be a memory region which stores at least two-bit information per cell.

The first write speed may be faster than the second write speed.

According to one or more example embodiments, a method of operating a controller may include receiving, at the controller, write data from a host, the write data including a plurality of data chunks; determining a plurality of finger prints, the plurality of finger prints corresponding to the plurality of data chunks, respectively; determining duplication values of the plurality of finger prints, such that, for each of the plurality of finger prints, the duplication value of the finger print represents a number of times the data chunk to which the finger print corresponds is duplicated within the plurality of data chunks; comparing each of the determined duplication values to a reference value; for each of the plurality of data chunks, assigning a physical address of a first memory region to the data chunk if the duplication value of the finger print corresponding to the data chunk is greater than or equal to the threshold value, and assigning a physical address of a second memory region to the data chunk if the duplication value of the finger print corresponding to the data chunk is less than the threshold value, the second memory region being different than the first memory region.

The physical addresses of the first and second memory regions may be assigned by a flash translation layer (FTL).

A write speed of the first memory area may be greater than a write speed of the second memory area.

The first memory area may store x-bit data, the second memory area may store y-bit data, and y may be greater than x.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

FIG. 3 is a conceptual diagram which describes a process of updating the table generated in FIG. 2;

FIG. 9 is a flowchart which describes a method of operating the data processing system shown in FIG. 1.

DETAILED DESCRIPTION

Figure 1:
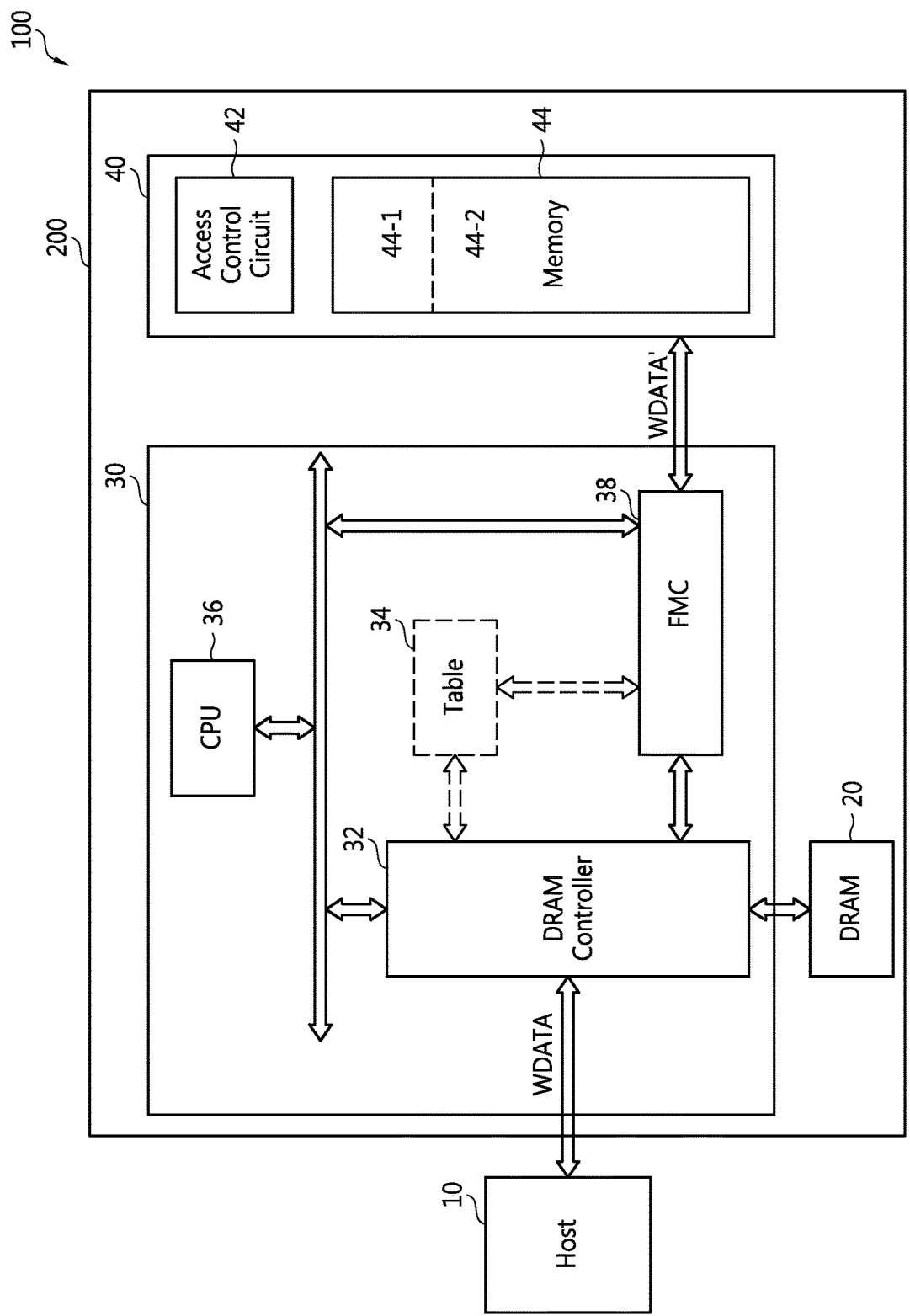
FIG. 1 is a block diagram of a data processing system according to at least one example embodiment of the present inventive concepts.

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of a data processing system according to at least one example embodiment of the present inventive concepts. Referring to FIG. 1, a data processing system 100 includes a host 10 and a data storage device 200. The data processing system 100 may be embodied in a personal computer (PC), a data server, or a portable electronic device.

The portable electronic device may be embodied in, for example, a laptop computer, a mobile phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT) device, an internet of everything (IoE) device, or an e-book.

The host 10 may be embodied in an integrated circuit (IC), a system on chip (SoC), an application processor (AP), or a mobile AP.

The term 'processor', as used herein, may refer to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multiprocessor, an application-specific integrated circuit (ASIC), and a field programmable gate array (FPGA).

The host 10 may transfer write data WDATA to the data storage device 200. The host 10 may control an operation of the data storage device 200. For example, the host 10 may transfer an operation mode setting signal which may set an operation mode to the data storage device 200, and the data storage device 200 may change a data storage method in response to the operation mode setting signal.

When the host 10 transfers data including an operation mode setting signal to the data storage device 200, the data storage device 200 may change an operation mode according to the operation mode setting signal, and perform a data storage process corresponding to the operation mode. The host 10 may transfer data including an operation mode setting signal separately from write data WDATA, and transfer data including an operation mode setting signal to the data storage device 200 according to a user's request.

According to an example embodiment, the host 10 may change an operation mode of the data storage device 200 so as to improve a write speed/data read speed for a memory region 44. The operation mode includes a normal mode, a boost mode, or an all boost mode. Each operation mode will be described referring to FIG. 6.

The data storage device 200 includes a first memory device 20, a controller 30, and a second memory device 40. The data storage device 200 may be embodied, for example, by a flash-based memory device. The flash-based memory device may be embodied in a multimedia card (MMC), an embedded MMC (eMMC), a universal flash storage (UFS), or a solid state drive (SSD).

The first memory device 20 may be embodied by, for example, a dynamic random access memory (DRAM) or a synchronous DRAM (SDRAM). The DRAM 20 may store write data WDATA output from the host 10 according to a control of a first memory controller 32. The controller 30 may control data transmitted or received among the host 10, the first memory device 20, and the second memory device 40.

The controller 30 includes a first memory controller 32, a central processing unit (CPU) 36, and a second memory controller 38. In the example illustrated in FIG. 1, the second memory controller 38 is embodied by a flash memory controller (FMC). In FIG. 1, the controller 30 is illustrated as including a table 34; however, the table 34 may be stored in a memory (for example, a register, a DRAM, or an SRAM) which can be accessed by the first memory controller 32, the CPU 36, and/or the second memory controller 38. The table 34 may collectively show each table 34A and 34B, which will be described in greater detail with reference to FIG. 2, and each table 34A, 34B, 36A, and 36B, which will be described in greater detail with reference to FIG. 3.

When the first memory device 20 is embodied in a DRAM, the first memory controller 32 may be embodied in a DRAM controller. The DRAM controller 32 may write a command or data (for example, write data WDATA or data including an operation mode setting signal) transferred from the host 10 in the DRAM 20.

The DRAM controller 32 may divide write data WDATA stored in the DRAM 20 on a data chunk (chunk) basis, generate a finger print on a data chunk basis, and store the generated finger print in the table 34. The data chunk means a minimum data unit which can be processed by the data storage device 200. For example, a data chunk in the present specification may be defined as a multiple of 512 bytes; however, according to one or more example embodiments of the inventive concepts the data chunk is not limited to a size of 512 bytes and may be larger or smaller. According to one or more example embodiments of the inventive concepts, the DRAM controller 32 generates the table 34 so as to check whether or not data are duplicated.

The CPU 36 may change a physical address assigned to a memory region 44 of each data chunk using data included in the table 34 received from the DRAM controller 32. The CPU 36 may count the number of duplications of each finger print stored in the table 34. For example, a physical address is assigned by a flash translation layer (FTL), and the assigned physical address can be changed by the CPU 36. The FTL may be performed by the CPU 36.

Since the finger prints are identifiers for the data chunks, respectively, the CPU 36 may determine whether or not each data chunk stored in the DRAM 20 is duplicated. When the number of duplications of a corresponding finger print is equal to or greater than a reference count value, the CPU 36 changes a current physical address to a physical address of a first memory region 44-1. When the number of duplications is less than the reference count value, the CPU 36 changes a current physical address to a physical address of a second memory region 44-2. According to one or more example embodiments of the inventive concepts, a write speed for the first memory region 44-1 is faster than a write speed for the second memory region 44-2. Thus, according to one or more example embodiments of the inventive concepts, data chunks corresponding to fingerprints that are duplicated an amount of times equal to or greater than reference number of times may be written to a memory area which has a higher write speed than a memory area to which other data chunks are written (e.g., data chunks corresponding to fingerprints that are duplicated an amount of times less than reference number of times).

The CPU 36 transfers each finger print including a changed physical address to the DRAM controller 32, and the DRAM controller 32 stores the each finger print in the table 34. That is, a physical address of each finger print stored in the table 34 is updated to be a physical address changed by the CPU 36.

A physical address of a finger print may refer to, for example, a physical address of memory region 44 in which a data chunk corresponding to the finger print is stored.

The second memory controller 38 may transfer a data chunk included in write data WDATA' received through the first memory controller 32 to the second memory device 40 using the updated table 34. For example, the second memory controller 38 may control the second memory device 40 so that a data chunk to be stored in the first memory region 44-1 may be stored in the second memory region 44-2 using the changed physical address included in the table 34. In addition, the second memory controller 38 may control the second memory device 40 so that a data chunk to be stored in the second memory region 44-2 may be stored in the first memory region 44-1 using the changed physical address included in the table 34.

The second memory device 40 includes an access control circuit 42 and the memory region 44.

The access control circuit 42 controls a data access operation for the memory region 44 according to a control of the second memory controller, e.g., FMC 38. The data access operation may include a data program operation, a data read operation, or a data erase operation.

The memory region 44 may include a plurality of memory regions 44-1 and 44-2 each with different features. For example, the first memory region 44-1 may include a single level cell (SLC) region, and the second memory region 44-2 may include a multi level cell (MLC) region. The SLC region may include a plurality of SLCs. Each of the SLCs may store one-bit information. The MLC region may include a plurality of MLCs. Each of the MLCs may store two-bit or more information. For example, data for which a relatively fast writing speed is desirable may be stored in the first memory region 44-1, and data for which a relatively fast writing speed is not as desirable may be stored in the second memory region 44-2.

Figure 8:
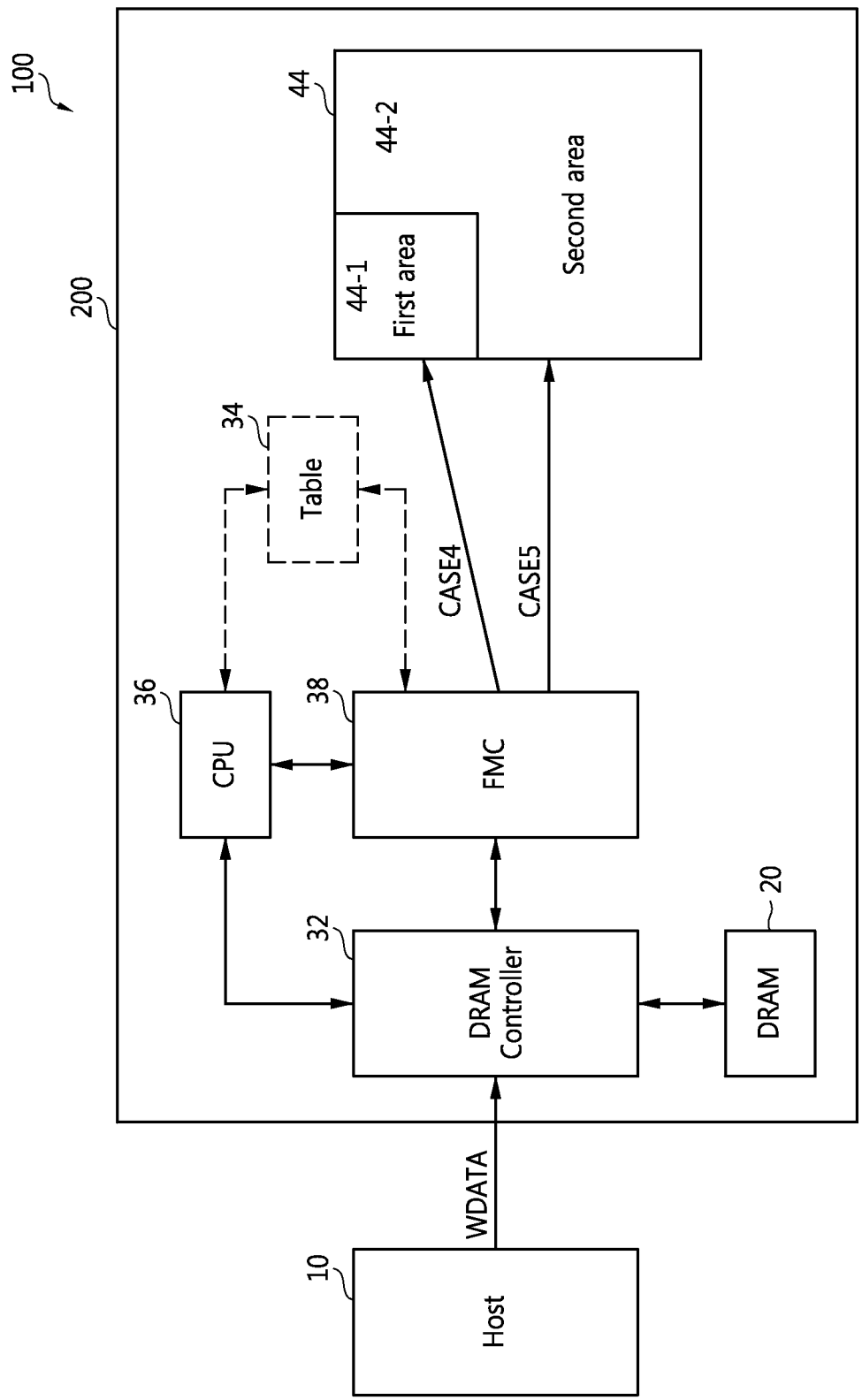
FIG. 8 is a conceptual diagram which describes a method of sorting data chunks and storing the data chunks in the data processing system shown in FIG. 1.

FIG. 8 is a conceptual diagram which describes a method of sorting and storing chunk data in the data processing system illustrated in FIG. 1. Referring to FIG. 8, the access control circuit 42 may store a data chunk to be stored in the first memory region 44-1 in the second memory region 44-2 (CASE4), and store a data chunk to be stored in the second memory region 44-2 in the first memory region 44-1 (CASE5) according to a control of the second memory controller, e.g., a FMC 38.

According to one or more example embodiments of the inventive concepts, a data write speed (or data program speed) for the first memory region 44-1 is faster than a data write speed for the second memory region 44-2. For example, the first memory region 44-1 may be defined as an SLC region. Here, the SLC region may structurally mean a single level cell (SLC), or, for example, a multi level cell (MLC) used like the SLC, a triple level cell (TLC) used like the SLC, or a quad level cell (QLC) used like the SLC.

According to an example embodiment of the inventive concepts, when a duplicated data chunk is written in the first memory region 44-1, the data chunk may be written several times in the same memory region. According to another example embodiment, when the duplicated data chunk is written in the first memory region 44-1, the data chunk may be written in each of a plurality of memory regions. Accordingly, data reliability in the duplicated data chunk is increased. The second memory region 44-2 may be defined as an MLC region.

Figure 2:
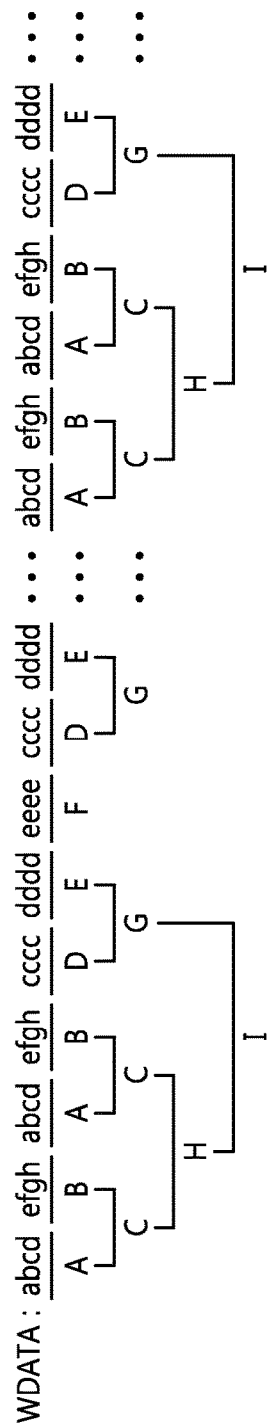
FIG. 2 is a conceptual diagram which describes a process of generating a table according to at least one example embodiment of the present inventive concepts.

FIG. 2 is a conceptual diagram which describes a process of generating a table according to at least one example embodiment of the present inventive concepts. Referring to FIG. 2, the DRAM controller 32 sequentially receives each data (abcdefghabcdefghccccddddeeeeccccdddd . . . abcdefghabcdefghccccdddd . . . ) included in write data WDATA output from the host 10, and stores each of the data (abcdefghabcdefghccccddddeeeeccccdddd . . . abcdefghabcdefghccccdddd . . . ) in the DRAM 20. For example, each of the data (abcdefghabcdefghccccddddeeeeccccdddd . . . abcdefghabcdefghccccdddd . . . ) may include one or more bits.

The DRAM controller 32 generates a data chunk from the data (abcdefghabcdefghccccddddeeeeccccdddd . . . abcdefghabcdefghccccdddd . . . ) to be stored in the DRAM 20. For example, when a size of a data chunk is four, a first data chunk abcd includes a first data a corresponding to a data offset 0 to a fourth data d corresponding to a data offset 3.

A second data chunk efgh includes a fifth data e corresponding to a data offset 4 to an eighth data h corresponding to a data offset 7. A third data chunk abcd includes a ninth data a corresponding to a data offset 8 to a twelfth data d corresponding to a data offset 11.

A fourth data chunk efgh includes a thirteenth data e corresponding to a data offset 12 to a sixteenth data h corresponding to a data offset 15. A fifth data chunk cccc includes a seventeenth data c corresponding to a data offset 16 to a twentieth data c corresponding to a data offset 19. The write data WDATA' are divided into data chunks with a fixed size.

Each finger print is an identifier for identifying each unique data chunk. For example, the first data chunk abcd may be represented (or defined) as a finger print A, the second data chunk efgh may be represented as a finger print B, two data chunks abcdefgh (or the finger print A combined with the finger print B) may be represented as a finger print C, the fifth data chunk cccc may be represented as a finger print D, the sixth data chunk dddd may be represented as a finger print E, the seventh data chunk eeee may be represented as a finger print F, two data chunks ccccdddd (or the finger print D combined with the finger print E) may be represented as a finger print G, four data chunks abcdefghabcdefgh (or a combination of two finger prints C) may be represented as a finger print H, and six data chunks abcdefghabcdefghccccdddd (or the finger print H combined with the finger print G) may be represented as a finger print I, and so on. The DRAM controller 32 may store each finger print, which may identify one or more data chunks using the write data WDATA stored in the DRAM 20, in the table 34A.

Referring to FIG. 2, the table 34A may include information for a number of finger print indexes, and for each finger print index, the table 34A may include, a link to a finger print corresponding to the finger print index, and physical address (PA) corresponding to the finger print index.

The DRAM controller 32 may generate a table 34A using a physical address (PA) assigned to each finger print included in the table 34A. For example, a physical address (PA) may be assigned by FTL.

The table 34A includes a physical address (PA) assigned to each of the finger prints (A, B, C, D, E, F, G, H, I, . . . ). For example, at least one data chunk identified by A can be stored in a memory region 44 corresponding to a physical address (PA=2311), at least one data chunk identified by B can be stored in a memory region 44 corresponding to a physical address (PA=0257), at least one data chunks identified by C can be stored in a memory region 44 corresponding to a physical address (PA=2333), at least one data chunk identified by D can be stored in a memory region 44 corresponding to a physical address (PA=3311), at least one data chunk identified by E can be stored in a memory region 44 corresponding to a physical address (PA=PAD1), at least one data chunk identified by F can be stored in a memory region 44 corresponding to a physical address (PA=PAD2), at least one data chunk identified by G can be stored in a memory region 44 corresponding to a physical address (PA=PAD3), at least one data chunk identified by H can be stored in a memory region 44 corresponding to a physical address (PA=PAD4), at least one data chunk identified by I can be stored in a memory region 44 corresponding to a physical address (PA=PAD5), and so on. The DRAM controller 32 transfers a table 34A to the CPU 36.

FIG. 3 is a conceptual diagram which describes a process of updating the tables generated in FIG. 2. Referring to FIG. 3, the DRAM controller 32 transfers the table 34A to the CPU 36. The CPU 36 counts the number of duplications of each finger print included in the table 34A. That is, the CPU 36 determines how many times each of the data chunks and combinations of data chunks identified by the finger prints included in table 34A are duplicated in the write data WDATA stored in the DRAM 20 based on the data included in the table 34A.

For example, referring to a table 36A generated according to a result of the counting by the CPU 36, the number of duplications of each finger print (A, B, C, D, . . . ), i.e., a count value (109, 23, 311, 4222, . . . ) is stored with a physical address (2331, 0257, 2333, 3311, . . . ).

The CPU 36 may align respective finger prints according to the number of duplications, e.g., a count value, compare the number of duplications of respective finger prints with a reference count value, and group respective finger prints into a plurality of groups according to a result of the comparison. For example, when the memory region 44 includes the first memory region 44-1 and the second memory region 44-2, and the reference count value is 100, the CPU 36 sorts respective finger prints A, C, and D into a first group (or a duplication group), and sorts a finger print B into a second group, because finger print B is the only finger print having a count value below the reference count value 100.

For example, in the example illustrated in FIG. 3, it is assumed that the first memory region 44-1 is defined from a physical address PA=0000 to a physical address PA=2000, and the second memory region 44-2 is defined from a physical address PA=2001. As described above, the first memory region 44-1 is an SLC region, and the second memory region 44-2 is an MLC region.

Since the number of duplications of respective finger prints A, C, and D is greater than the reference count value, the CPU 36 changes respective physical addresses 2311, 2333, and 3311 of the second memory region 44-2 corresponding to respective finger prints A, C, and D into, for example, respective physical addresses 0711, 0010, and 0000 of the first memory region 44-1 as is shown by table 36B in FIG. 3. However, since the number of duplications of a finger print B is less than the reference count value, the CPU 36 changes a physical address 0257 of the first memory region 44-1 corresponding to the finger print B into, for example, a physical address 2355 of the second memory region 44-2 as is shown by table 36B in FIG. 3.

The CPU 36 generates the table 36B which includes a physical address PA sorted and changed according to the number of duplications, and transfers the generated table 36B to the DRAM controller 32. The DRAM controller 32 generates the table 34B by, for example, sorting the table 36B in accordance with index values of the fingerprints included in the table 36B.

Figure 4:
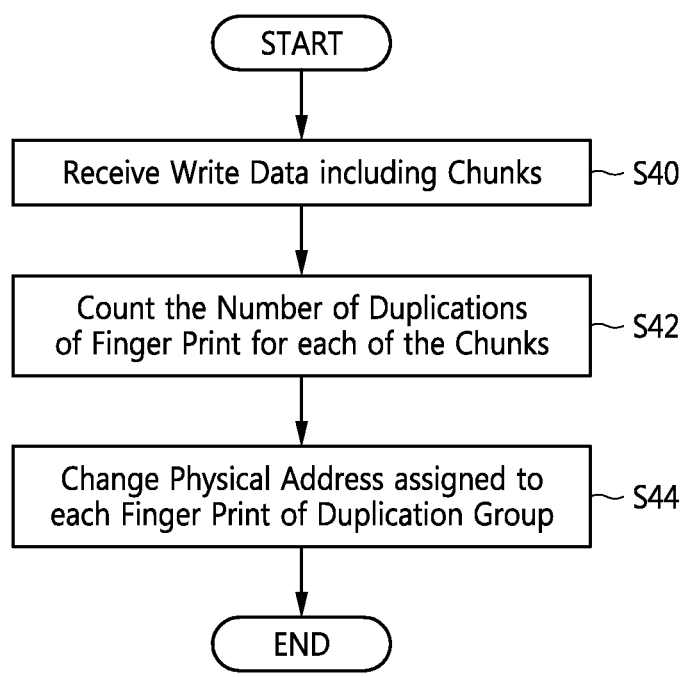
FIG. 4 is a flowchart which describes a method of operating a controller shown in FIG. 1.

FIG. 4 is a flowchart for describing a method of operating the controller illustrated in FIG. 1. Referring to FIGS. 1 to 4, when the controller 30 receives write data WDATA including a plurality of data chunks from the host 10 (S40), the controller 30 generates finger prints corresponding to each of the received data chunks, respectively.

The CPU 36 of the controller 30 counts the number of duplications of a corresponding finger print using the table 34 including a plurality of finger prints (S42), and changes a physical address of the memory region 44 assigned to each finger print based on the counted number of duplications for each finger print such that finger prints having a number of duplications higher than or equal to a threshold number are assigned to a memory region having a faster write speed and finger prints having a number of duplications lower than the threshold number are assigned to a memory region having a slower write speed.

Figure 5:
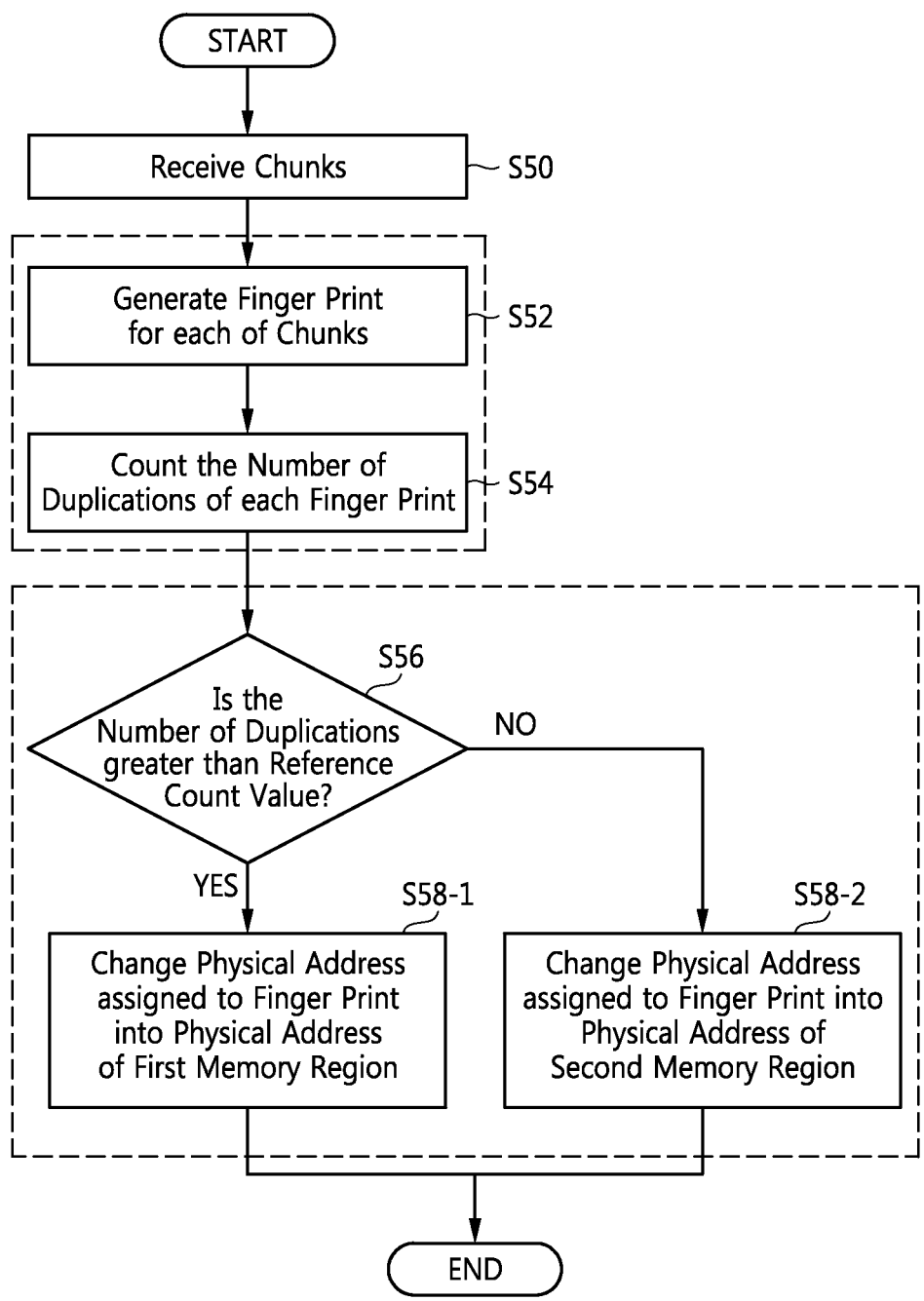
FIG. 5 is a flowchart which describes the method of operating a controller shown in FIG. 1 in a more detailed manner.

FIG. 5 is a flowchart for describing the method of operating a controller shown in FIG. 1 in a more detailed manner. Referring to FIGS. 1 to 5, the controller 30 receives a plurality of data chunks from the host 10 (S50), and the controller 30, e.g., the DRAM controller 32, generates a finger print for each of the plurality of data chunks (S52). The controller 30, e.g., the CPU 36, counts the number of duplication of each finger print (S54), and performs a comparison operation on the finger print by comparing the counted number of duplications and a reference count value (S56).

When the number of duplications of a finger print on which the comparison operation is being performed is equal to or greater than the reference count value, a physical address that corresponds to the finger print and is assigned to the second memory region 44-2 among physical addresses assigned to all finger prints is changed to a physical address of the first memory region 440 (S58-1), and when the number of duplications of the finger print on which the comparison operation is being performed is less than the reference count value, a physical address that corresponds to the finger print and is assigned to the first memory region 44-1 among the physical addresses assigned to all finger prints is changed to a physical address of the second memory region 44-2 (S58-2). For example, an FTL may assign each of the physical addresses to each of the finger prints.

Figure 6:
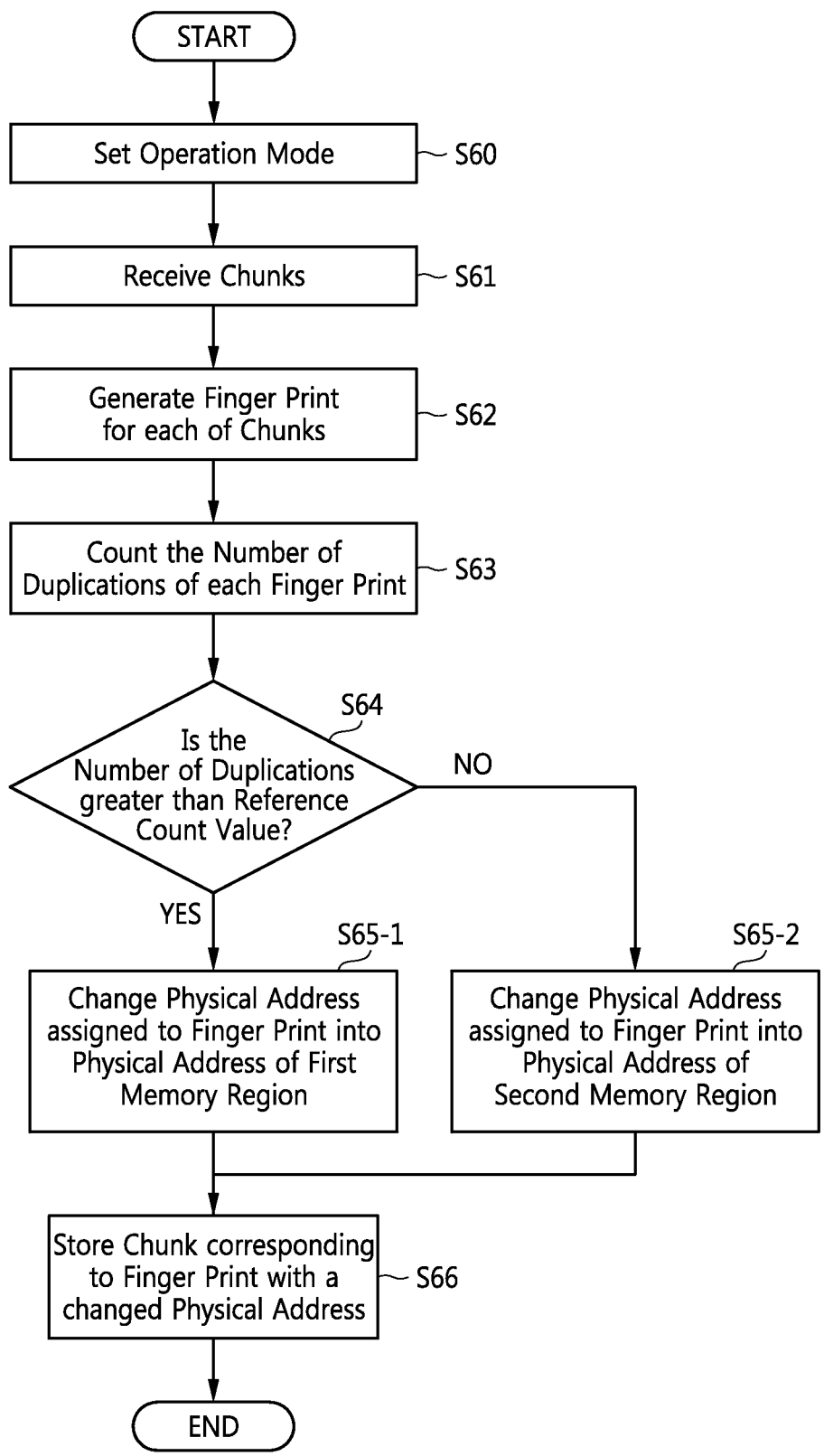
FIG. 6 is a flowchart which describes another method of operating the controller shown in FIG. 1.

FIG. 6 is a flowchart which describes another method of operating the controller shown in FIG. 1. The host 10 transfers an operation mode setting signal to a data storage device 200. That is, the data storage device 200 may set an operation mode in response to the operation mode setting signal (S60). For example, the host 10 may transfer the operation mode setting signal to the data storage device 200 before transferring write data WDATA' to the data storage device 200. The host 10 may generate the operation mode setting signal according to a request of a user.

An operation mode of the data storage device 200 may be a normal mode, a boost mode, or an all boost mode.

The normal mode is a mode of storing write data WDATA in the memory region 44 of the second memory device 40 without confirming whether or not the write data WDATA includes duplicated data. That is, according to one or more example embodiments of the inventive concepts, the controller 30 in the normal mode does not determine whether or not the write data includes duplicated data, and stores the write data WDATA in a determined physical address of the memory region 44. In the normal mode, the controller 30 does not change a physical address.

The controller 30 in the boost mode determines whether or not the write data includes duplicated data. In the boost mode, the controller 30 determines whether or not the write data includes duplicated data by data chunk with a determined size. The controller 30 in the boost mode determines the number of duplications by data chunk included in the write data WDATA, stores data chunks sorted into a duplication group (or first group) in the first memory region 44-1 according to a result of the determination, and stores the rest data chunks sorted into a second group in the second memory region 44-2. The duplication group (or first group) may be a location of data chunks corresponding to finger prints having duplication counts above a reference number.

In the all boost mode, the controller 30 determines whether or not the write data WDATA includes duplicated data. At this time, the controller 30 determines whether or not the write data WDATA includes duplicated data by data chunk with a determined size. For example, the controller 30 determines whether or not the write data WDATA are duplicated by data chunk, stores all data chunks which are duplicated at least once or more times in the first memory region 44-1, and stores data chunks which are not duplicated even once in the second memory region 44-2. For example, a physical address may be changed in the all boost mode.

A speed of storing data chunks in the all boost mode is faster than a speed of storing data chunks in the boost mode. However, when there is not an enough storage space in the first memory region 44-1 while the data storage device 200 operates in the all boost mode, an operation mode of the data storage device 200 may be switched from the all boost mode to the boost mode.

The controller 30 receives a plurality of data chunks from the host 10 (S61), and the controller 30, e.g., the DRAM controller 32, generates a finger print for each of the plurality of data chunks (S62). The controller 30, e.g., a CPU 36, counts the number of duplications of each finger print (S63), and performs a comparison operation on the finger print by comparing the counted number of duplications with a reference count value (S64).

When the number of duplications of a finger print on which the comparison operation is being performed is equal to or greater than the reference count value, a physical address that corresponds to the finger print and is assigned to the second memory region 44-2 among physical addresses assigned to all finger prints is changed to a physical address of the first memory region 44-1 (S65-1), and when the number of duplications of a finger print on which the comparison operation is being performed is less than the reference count value, a physical address that corresponds to the finger print ad is assigned to the first memory region 44-1 among the physical addresses assigned to all finger prints is changed to the physical address of the second memory region 44-2 (S65-2).

Figure 7:
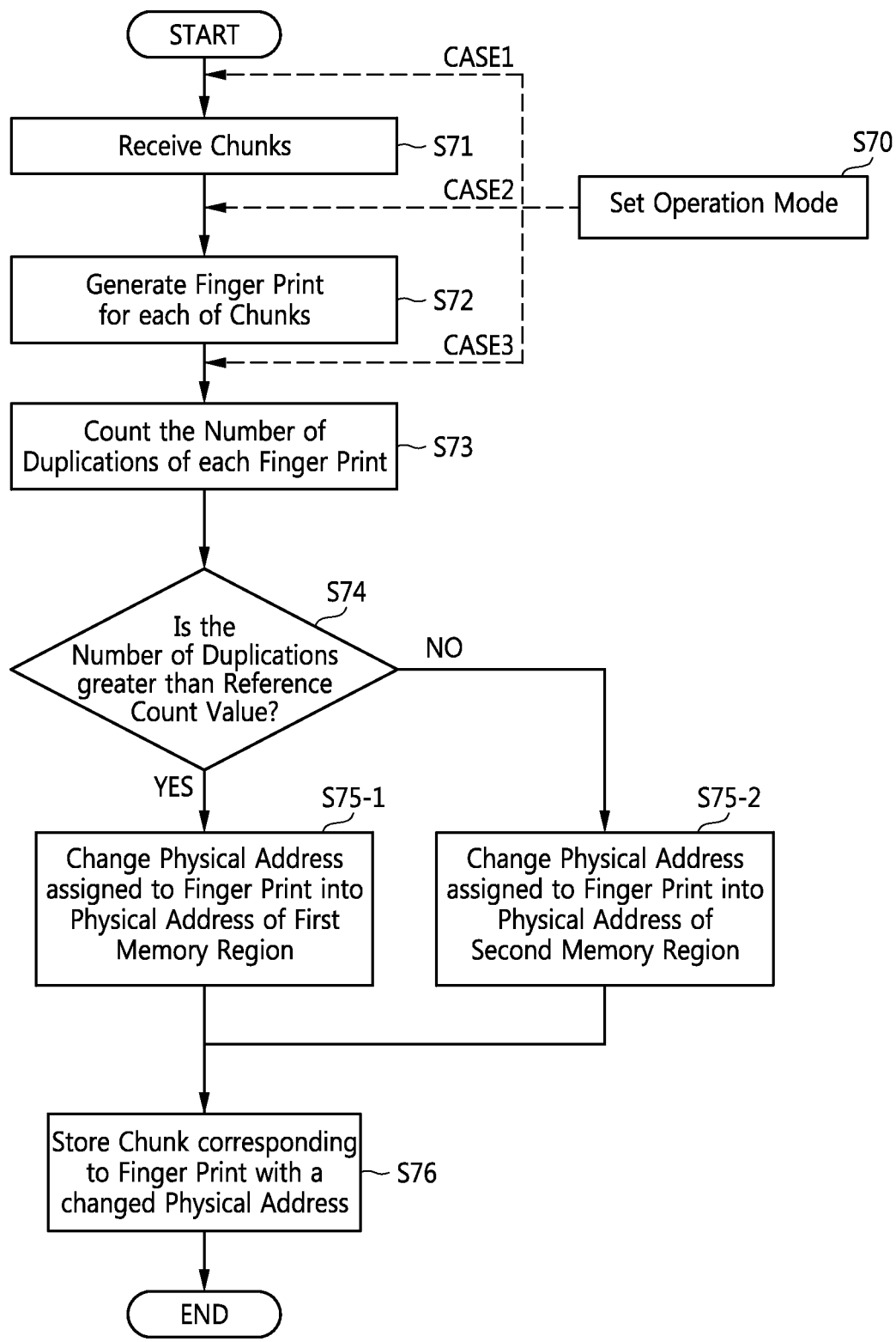
FIG. 7 is a flowchart which describes a method of operating the controller shown in FIG. 1 depending on an operation mode setting time.

The data storage device 200 stores a data chunk corresponding to each finger print in the memory region 44 corresponding to the changed physical address according to a control of the controller 30 (S66). FIG. 7 is a flowchart which describes a method of operating the controller shown in FIG. 1 depending on an operation mode setting time.

Referring to FIGS. 6 and 7, an operation mode may be set before the write data WDATA is received (CASE1), after the write data WDATA is received (CASE2), or after the finger prints for each of the data chunks of the write data WDATA are generated (CASE3).

The controller 30 receives a plurality of data chunks from the host 10 (S71), and the controller 30, e.g., the DRAM controller 32, generates a finger print for each of the plurality of data chunks (S72). The controller 30, e.g., the CPU 36, counts the number of duplications of each finger print (S73), and performs a comparison operation on the finger print by comparing the counted number of duplications with a reference count value (S74).

When the number of duplications of a finger print on which the comparison operation is being performed is equal to or greater than a reference count value, a physical address that corresponds to the finger print and is assigned to the second memory region 44-2 among physical addresses assigned to all finger prints is changed to a physical address of the first memory region 44-1 (S75-1), and when the number of duplication of a finger print on which the comparison operation is being performed is less than the reference count value, a physical address that corresponds to the finger print and is assigned to the first memory region 44-1 among physical addresses assigned to all finger prints is changed to the physical address of the second memory region 44-2 (S75-2). The data storage device 200 stores a data chunk corresponding to each finger print in the memory region 44 corresponding to the changed physical address according to a control of the controller 30 (S76).

FIG. 9 is a flowchart which describes an operation method of the data processing system shown in FIG. 1. Referring to FIGS. 1 to 9, the controller 30 receives a plurality of data chunks from the host 10 (S90), and the controller 30, e.g., the DRAM controller 32, generates a finger print for each of the plurality of data chunks (S91).

The controller 30 determines whether or not to perform a boost or all boost mode based on an operation mode setting signal output from the host 10 (S92). When neither the boost mode nor the all boost mode is executed, that is, when a normal mode is performed, the controller 30 stores a data chunk in a memory region 44 corresponding to an assigned physical address (S98). The controller 30 determines whether or not to execute a boost mode or all boost mode based on an operation mode setting signal output from the host 10 (S93).

When the all boost mode is not performed, that is, when the boost mode is performed, the controller 30, e.g., the CPU 36, counts the number of duplications of each finger print (S94-1), and performs a comparison operation by comparing the counted number of duplications with the reference count (S96).

When the number of duplications of a finger print on which the comparison operation is being performed is equal to or greater than the reference count value, a physical address that corresponds to the finger print and is assigned to the second memory region 44-2 among physical addresses assigned to all finger prints is changed to a physical address of the first memory region 44-1 (S97-1), and when the number of duplications of a finger print on which the comparison operation is being performed is less than the reference count value, a physical address that corresponds to the finger print and is assigned to the first memory region 44-1 among the physical address assigned to all finger prints is changed to the physical address of the second memory region 44-2 (S97-2).

When the all boost mode is performed, the controller 30, e.g., the CPU 36, determines whether or not there is duplication by data chunk, sorts all of data chunks which have been duplicated at least one or more times into duplicated finger prints, and sorts all of data chunks which have not been duplicated even once into non-duplicated finger prints (S94-2).

When a finger print is determined to be a duplicated finger print in step S95, and a physical address assigned to the duplicated finger print is a physical address assigned to the second memory region 44-2, the physical address assigned to the duplicated finger print is changed to a physical address of the first memory region 44-1 (S97-1). However, when a finger print is determined to be a non-duplicated finger print in step S95, and a physical address assigned to the non-duplicated finger print is a physical address assigned to the first memory region 44-1, the physical address is changed to a physical address of the second memory region 44-2 (S97-2).

The data storage device 200 stores a data chunk corresponding to each finger print in the memory region 44 corresponding to an assigned physical address according to a control of the controller 30 (S98).

A method of operating a controller according to at least one example embodiment of the present inventive concepts may count the number of duplications of data to be written in a memory region having a relatively slow write speed, and write the data in a memory region having a relatively fast write speed according to a result of the counting. Accordingly, since the data can be written in a memory region which is physically safe, thereby increasing reliability of the data.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A method of operating a controller comprising:
   receiving write data including a plurality of data chunks from a host;
   assigning a plurality of finger prints to the plurality of data chunks, respectively;
   counting a number of duplications of each of the plurality of finger prints; and
   changing physical addresses assigned, respectively, to first finger prints among the plurality of finger prints based on a count value of each of the plurality of finger prints,
   wherein the physical addresses are assigned by a flash translation layer (FTL).

2. The method of claim 1, wherein count values of each of the first finger prints are equal to or greater than a reference count value.

3. The method of claim 2, wherein,
   when physical addresses corresponding to the first finger prints indicate a second memory region, the changing changes the physical addresses corresponding to the first finger prints into physical addresses indicating a first memory region,
   the first memory region is a memory region which stores one-bit per cell, and
   the second memory region is a memory region which stores at least two-bits per cell.

4. The method of claim 1, wherein a count value for each of the first finger prints is less than a reference count value.

5. The method of claim 4, wherein,
   when physical addresses corresponding to the first finger prints indicate a first memory region, the changing changes the physical addresses corresponding to the first finger prints into physical addresses indicating a second, memory region,
   the first memory region is a memory region which stores one-bit per cell, and
   the second memory region is a memory region which stores at least two-bits per cell.

6. The method of claim 1, wherein, when the physical addresses assigned to each of the first finger prints indicate a first memory region having a first write speed, the changing changes the physical addresses assigned to each of the first finger prints into physical addresses which indicate a second memory region having a second write speed.

7. The method of claim 6, wherein the first memory region is a memory region which stores one-bit information per cell, and the second memory region is a memory region which stores at least two-bit information per cell.

8. The method of claim 6, wherein the first write speed is faster than the second write speed.

9. The method of claim 1, wherein the counting and the changing are performed by firmware executed by a CPU embedded in the controller.

10. A method of operating a data storage device which includes a memory device including memory regions with different features and a controller controlling an operation of the memory device, the method comprising:
    receiving a plurality of data chunks successively input;
    assigning a plurality of finger prints to the plurality of data chunks, respectively;
    generating count values for each of the plurality of finger prints by counting a number of duplications of each of the plurality of finger prints;
    selecting first finger prints among the plurality of finger prints based on the count values of the plurality of finger prints;
    changing physical addresses assigned to each of the selected first finger prints; and
    writing each data chunk that corresponds to one of the changed physical addresses, among the plurality of data chunks, in one of the memory regions, wherein the physical address is assigned by a flash translation layer (FTL).

11. The method of claim 10, wherein the selecting includes:
comparing the count values of each of the plurality of finger prints with a reference count value; and
selecting the first finger prints according to a result of the comparison.

12. The method of claim 11, wherein, when the count value of each of the first finger prints are equal to or greater than the reference count value,
the physical addresses assigned to each of the selected first finger prints before the changing indicate a memory region which stores at least two-bits per cell among the memory regions, and
the changed physical addresses assigned to each of the selected first finger prints indicate a memory region which stores one-bit per cell among the memory regions.

13. The method of claim 11, wherein, when the count value of each of the first finger prints are less than the reference count value,
the physical addresses assigned to each of the selected first finger prints before the changing indicate a memory region which stores at least one-bit per cell among the memory regions, and
the changed physical addresses assigned to each of the selected first finger prints indicate a memory region which stores two-bits per cell among the memory regions.

14. The method of claim 10, wherein, when the physical addresses assigned to each of the first finger prints indicate a first memory region having a first write speed, the changing changes physical addresses assigned to each of the selected first finger prints into physical addresses which indicate a second memory region having a second write speed.

15. The method of claim 14, wherein the first memory region is a memory region which stores one-bit information per cell, and the second memory region is a memory region which stores at least two-bit information per cell.

16. The method of claim 14, wherein the first write speed is faster than the second write speed.

17. A method of operating a controller comprising:
receiving, at the controller, write data from a host, the write data including a plurality of data chunks;
determining a plurality of finger prints, the plurality of finger prints corresponding to the plurality of data chunks, respectively;
determining duplication values of the plurality of finger prints, such that, for each of the plurality of finger prints, the duplication value of the finger print represents a number of times the data chunk to which the finger print corresponds is duplicated within the plurality of data chunks;
comparing each of the determined duplication values to a reference value;
for each of the plurality of data chunks,
assigning a physical address of a first memory region to the data chunk if the duplication value of the finger print corresponding to the data chunk is greater than or equal to a threshold value, and
assigning a physical address of a second memory region to the data chunk if the duplication value of the finger print corresponding to the data chunk is less than the threshold value, the second memory region being different than the first memory region.

18. The method of claim 17 wherein the physical addresses of the first and second memory regions are assigned by a flash translation layer (FTL).

19. The method of claim 17 wherein a write speed of the first memory region is greater than a write speed of the second memory region.

20. The method of claim 17 wherein the first memory region stores x-bit data, the second memory region stores y-bit data, and y is greater than x.

* * * * *